United States Patent

Stetson, Jr.

[11] Patent Number: 5,333,819
[45] Date of Patent: Aug. 2, 1994

[54] SELF TUNING MOTION/VIBRATION SUPPRESSION SYSTEM

[75] Inventor: John B. Stetson, Jr., New Hope, Pa.

[73] Assignee: General Electric Company, East Windsor, N.J.

[21] Appl. No.: 31,252

[22] Filed: Mar. 12, 1993

[51] Int. Cl.$^5$ ................................................ B64G 1/38
[52] U.S. Cl. ..................... 244/164; 188/378; 248/550; 364/508
[58] Field of Search ............... 244/17, 27, 164, 165, 244/176, 170; 310/13, 15, 111, 51; 318/128, 135; 381/71; 248/550, 559; 188/378; 367/1, 191, 508, 509; 364/463, 459

[56] References Cited

U.S. PATENT DOCUMENTS

| | | | |
|---|---|---|---|
| 3,836,098 | 9/1974 | Miyashita | 244/17.27 |
| 4,083,433 | 4/1978 | Geohegan, Jr. et al. | 188/378 |
| 4,470,121 | 9/1984 | Eberf | 188/378 |
| 4,483,425 | 11/1984 | Newman | 188/378 |
| 4,922,159 | 5/1990 | Phillips et al. | 318/128 |
| 5,131,611 | 7/1992 | Vollaro | 244/158 |
| 5,209,326 | 5/1993 | Harper | 188/378 |

Primary Examiner—Galen L. Barefoot
Attorney, Agent, or Firm—W. H. Meise; C. A. Berard; S. A. Young

[57] ABSTRACT

A vibration suppression system senses undesired mechanical motion of a body, and continuously drives a proof mass actuator system to reduce disturbances. An inertial or relative displacement sensor is processed to determine the energy content of the motion, and a correction signal is generated which is summed with the actuator drive signal to minimize the sensed motion energy. The position of the proof mass is sensed, and processed by differentiating and scaling, and the processed proof mass position signal is also summed with the actuator drive signal. The system causes the proof mass actuator loop natural frequency to tend to track the frequency associated with the maximum vibrational energy.

5 Claims, 4 Drawing Sheets

80

SELF TUNING MOTION/VIBRATION SUPPRESSION SYSTEM

BACKGROUND OF THE INVENTION

This invention relates to systems for suppressing motion or vibration, and more particularly to self-adjusting systems adapted for use on remote systems such as spacecraft.

Modern spacecraft often carry instruments that must be pointed toward targets with an accuracy less than 1 minute of arc. Spacecraft attitude control systems are able to achieve such accuracies. Often, however, the instruments are mounted on arms or booms extending from the spacecraft body. Vibrations of the arms may directly perturb the instrument pointing. The bandwidth of the attitude control system may be insufficient to damp vibratory motions, and in any case, cannot cope with pointing inaccuracies resulting from flexural vibrations.

Many sources of motion or vibration exist on modern spacecraft: actuators, momentum wheels, scanning instruments, articulating antennas, tape recorders and the like, all of which may contribute vibrational disturbances.

Passive and active vibration damping systems are well known for suppressing such induced vibrations. Passive systems include dashpots with viscous liquids, which, however, tend to be temperature sensitive and heavy. An active system is described, for example, in U.S. Pat. No. 4,922,159, issued May 1, 1990 in the name of Phillips et al. Active systems include a sensor for measuring vibration, a proof-mass actuator coupled to a vibrating body, and a feedback loop for tending to reduce the unwanted motion.

Active dampers, such as that described in the above-mentioned Phillips et al. patent, include feedback loops which tend to be make the disturbance rejection capability frequency sensitive. When a spacecraft includes many potential sources of vibration representing a wide spectrum of frequencies, a single active damping system is incapable of simultaneously performing effective damping of all the vibrations.

Weight considerations preclude the use of a large number of such active dampers in spacecraft applications to damp vibrations of different frequencies. Even if it were possible to include several active vibration dampers on a spacecraft, they might still not provide adequate damping because the vibration modes are time varying, and depend inter alia on temperature and rotational velocity.

An improved motion suppression system is desired.

SUMMARY OF THE INVENTION

A compensation system according to the invention imparts mechanical motion to a proof mass. The system includes a first body elastically coupled to a second body, and a source of energy for causing mechanical motion or vibration of a body. The proof mass is coupled by an actuator to one of the bodies for causing proof mass motion in response to an actuator drive signal. A motion sensor generates a motion signal representative of one of the bodies' motion. The motion signal includes at least motion rate information. A controller arrangement coupled to the motion sensor generates an actuating signal for the actuator. The actuating signal includes proportional and derivative components of the motion signal, and proportional and derivative components of the actuator's position.

In a particular embodiment of the invention, the vibration energy is determined by a circuit, coupled to the vibration sensor, that squares the rate component of the vibration signal, producing a motion energy signal representative of the energy contained in the motion. The motion energy signal is integrated to produce an integrated energy signal representative of the average of the total vibration energy. In an embodiment of the invention, the average is calculated as a moving average, and a compensation correction factor is calculated. The compensation correction factor continuously adjusts the magnitude and phase of the actuator drive signal in a manner which tends to maintain the integrated energy signal near a minimum, and provides maximum disturbance rejection over a wide dynamic range.

DESCRIPTION OF THE INVENTION

Figure 1:
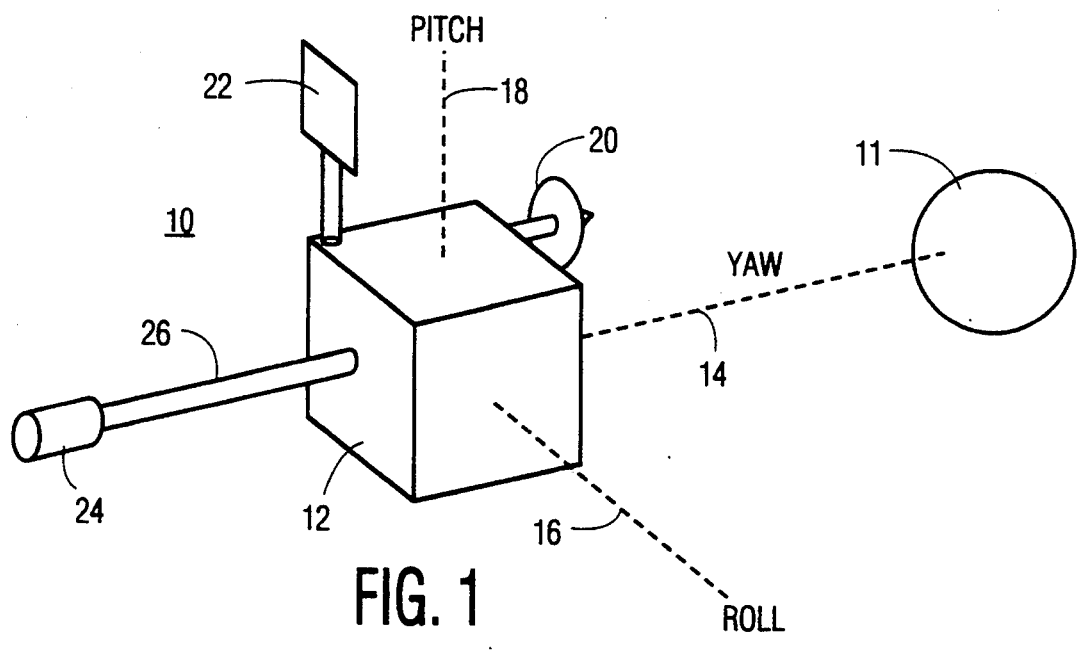
FIG. 1 is a perspective or isometric view of a spacecraft including a sensor on a boom.

FIG. 1 is a perspective or isometric view of a spacecraft 10, in orbit about a heavenly body 11. In FIG. 1, spacecraft 10 includes a body 12, oriented relative to yaw, roll, and pitch axes 14, 16, and 18, respectively. Spacecraft 10 includes a payload, represented by an antenna 20, and also includes a solar panel 22, for generating electrical power to sustain spacecraft and payload operation. FIG. 1 also illustrates an instrument designated as 24, held to body 12 by an elongated mast 26.

Figure 2A:
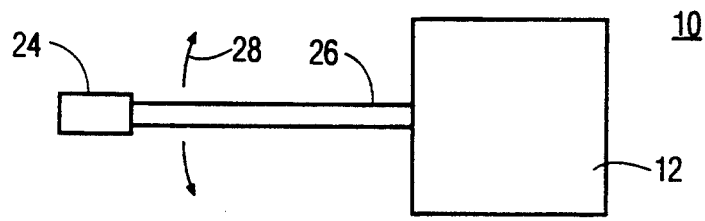
FIG. 2a is simplified representation of the structure of FIG. 1 illustrating flexural motion.
Figure 2B:
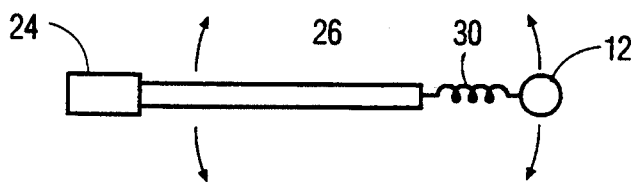
FIG. 2b is a schematic representation thereof.

Those skilled in the art know that when the location and orientation of instrument 24 must be accurately known relative to the heavenly body 11, not only must the attitude of the spacecraft body be known and controlled, but the vibratory condition of mast 26 must also be known, so that the position of the instrument may be properly related to the position of the body. FIG. 2a is a simplified view of the arrangement of FIG. 1 illustrating body 12 as a block, instrument 24 as a mass, and representing the principal flexural mode of mast 26, by arrows 28. The representation of FIG. 2a assumes that the position of body 12 remains fixed during flexure of mast 26. FIG. 2b represents the physical motion associated with the principal flexural mode as in FIG. 2a, recognizing that body 12, now illustrated as a simple mass, also moves in inertial space as a result of the vibration. Also in FIG. 2b, the flexural compliance is represented by a simple spring 30.

Figure 3A:
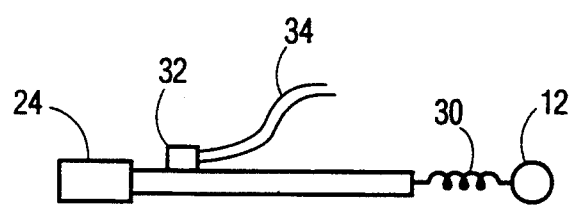
FIG. 3a is similar to FIG. 2b, illustrating the use of an inertial motion sensor to determine motion.
Figure 3B:
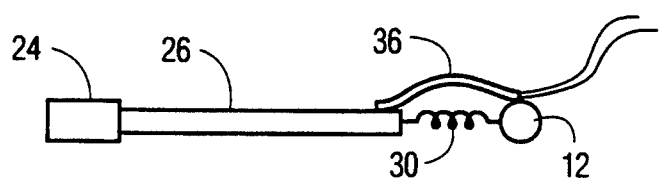
FIG. 3b illustrates a relative motion detection sensor.

FIG. 3a is similar to FIG. 2b and additionally illustrates an inertial motion sensor 32, affixed to mast 26, for producing a signal on wires 34 representative of the motion of mast 26 and mass 24. An inertial motion sensor may be a 3-axis spring-mass accelerometer. If velocity or position sensing is required, the acceleration-representative output signal of accelerometer 32 may be integrated once or twice in time, as is well known in the art. FIG. 3b illustrates an alternative motion sensor 36 in the form of a piezoelectric relative strain sensor coupled at one end to mass 24 and mast, 26. Sensor 36 produces a strain signal representative of the relative position of masses 12 and 24.

Figure 4:
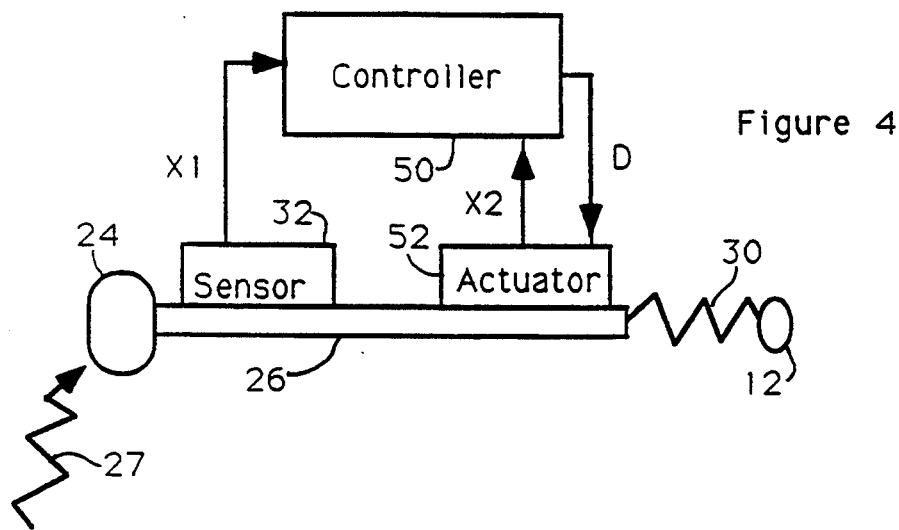
FIG. 4 is a simplified block diagram of a vibration suppression system in accordance with the invention.

FIG. 4 is a simplified block diagram of a motion suppression arrangement in accordance with the invention. Elements of FIG. 4 corresponding to those of FIG. 2b and 3a are designated by like reference numerals. In FIG. 4, the accelerometer sensor 32 produces a double-integrated position signal, X1 in response to an energy stimulus illustrated as 27 applied to mass 24. Position signal X1 is applied to a controller 50. Controller 50 responds to the position signal 32 and to an actuator position signal X2 described further below, to produce an actuator drive signal D which is applied to an actuator 52 fixed to mast 26. In operation, motion of mass 24 and/or mast 26, sensed by sensor 32, is processed by controller 50, and applied to drive a proof mass associated with actuator 52 in a manner that opposes the initial motion. Consequently, maximum benefit of the invention is achieved when the sensor and actuator are co-located, mutually adjacent, or at least affixed to the same rigid body.

Figure 5:
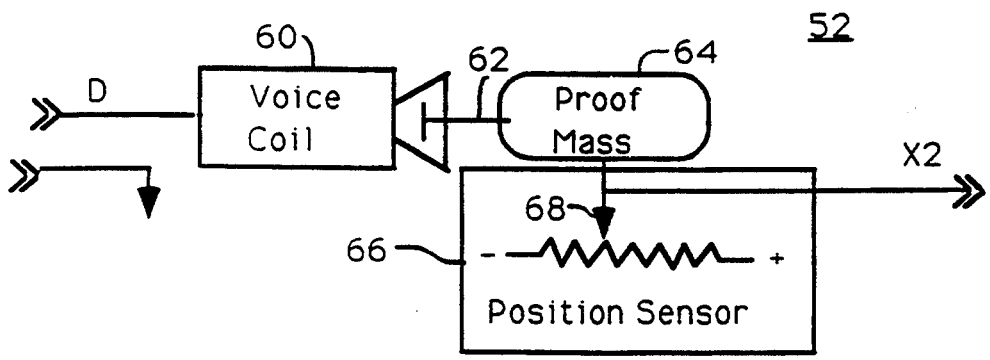
FIG. 5 is a simplified block diagram of an actuator for use in the arrangement of FIG. 4.

FIG. 5 is a simplified diagram representing actuator 52 of FIG. 4. In FIG. 5, drive signal D is applied to a voice coil 60, which is affixed by an arm 62 to a proof mass, 64. A position sensor 66, associated with proof mass 64, is represented as a wiper 68 that moves with proof mass 64, and which picks up a voltage from a differential potentiometer 70. The position-representative signal is designated X2. Referring once again to FIG. 4, proof mass position X2 is applied to controller 50.

Figure 6:
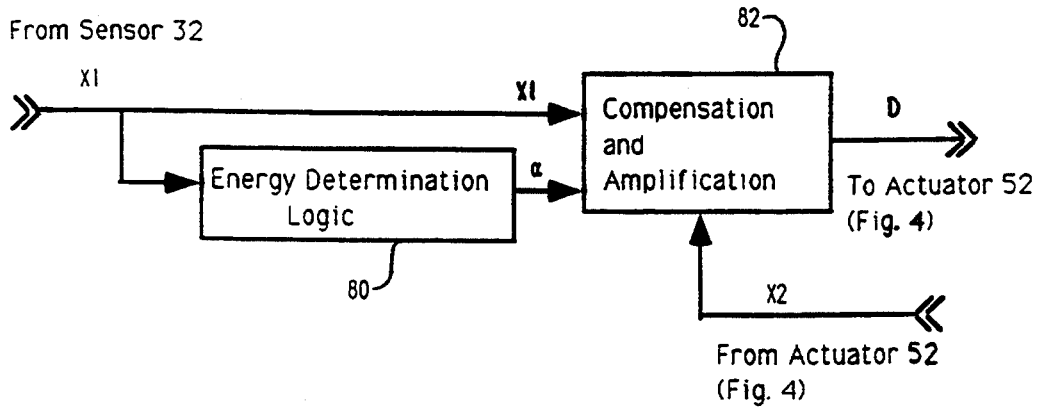
FIG. 6 is a simplified block diagram of the controller portion of the arrangement shown in FIG. 4.

FIG. 6 is a simplified block diagram of controller 50 of FIG. 4. In FIG. 6, mass position signal X1 is applied to an energy determination logic circuit 80 for generating a compensation correction factor $\alpha$, produced by energy determination logic 80. Position signal X1 is also applied to a compensation and amplification block 82 together with a compensation correction factor $\alpha$. Compensation and amplification block 82 also receives position signal X2 from actuator 52 of FIG. 4, for producing actuator drive signal D.

Figure 7:
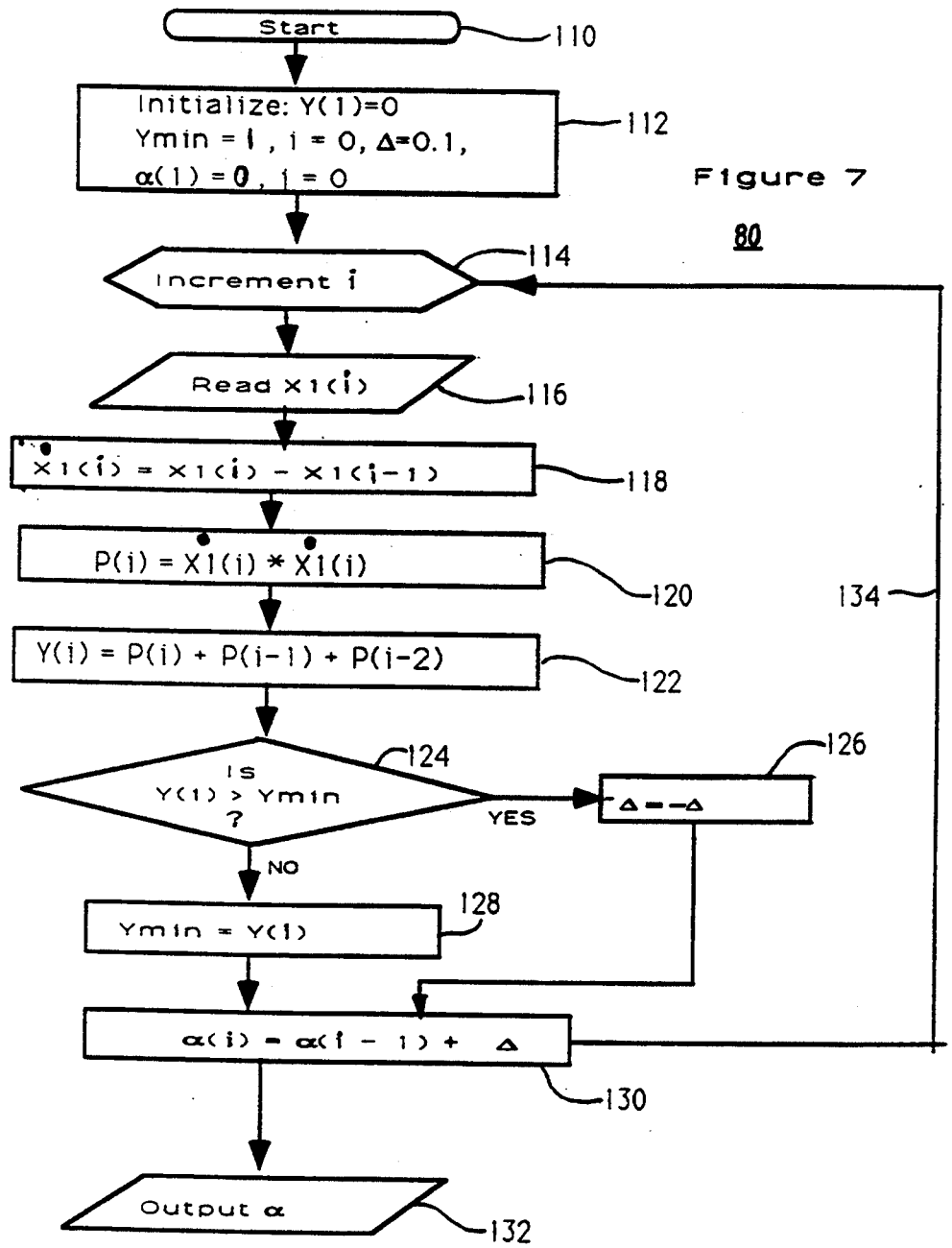
FIG. 7 is a simplified flowchart illustrating logic which may be used in conjunction with the arrangement of FIG. 6.

FIG. 7 is a flowchart representing a method for performing the logic of energy determination block 80. In general, the logic of FIG. 7 operates on the motion or vibration signal X1 (the double integrated position signal) and determines its energy content. For example, if the motion of mass 24 of FIG. 4 is in the form of a vibration including a range or spectrum of frequencies, the logic of FIG. 7 determines the total energy content of that spectrum. The logic of FIG. 7 starts at a start block 110 and proceeds to a parameter initialization block 112, wherein a running variable i is set to 0, a compensation correction factor $\alpha$ is set to zero, a compensation correction factor increment $\Delta$ is set to 0.1, a moving energy average variable Y(1) is set to 0, and a minimum value of the moving energy average Ymin is set to 1. From block 112, the logic flows to block 114, representing the incrementing of running variable i. The current value of motion or vibration signal X1 is read in a block 116, and the logic flows to a block 118. In block 118, the motion or vibration signal X1(i) is time-differentiated by subtraction of successive values to produce the motion velocity signal X1(i), $$X1(i) = X1(i) - X1(i-1) \quad (1)$$

Block 120 represents determination of the current energy component P(i) in the motion or vibration signal X1(i) by squaring the motion velocity signal X1(i), $$P(i) = X(i) * X(i) \quad (2)$$

The total energy Y(i) within a moving time window, is calculated in block 122 by accumulating successive values. As illustrated in FIG. 7, Block 122 accumulates over a window including 3 values:

$$Y(i) = P(i) + P(i-1) + P(i-2) \quad (3)$$

although, of course, the time window may include any number of past values of the energy component P(i).

From block 122, the logic flows to a decision block 124, which compares the current total vibrational energy, Y(i), with Ymin. During the first iteration, the value of Ymin is unity and Y(i) will be in all likelihood less than 1. For the first iteration, therefore, the logic will probably leave by the NO path, and arrive at a block 128, in which the current value of Ymin is updated to equal Y(i). During normal operation, the continuous incrementing (described below) will eventually result in the motion energy exceeding Ymin, whereupon the logic will leave logic block 124 by the YES path, to arrive at a block 126. Logic block 126 represents reversal of sign of the increment $\Delta$. By either path the logic arrives at block 130 in which the current compensation correction factor $\alpha(i)$ is calculated by summing its previous value $\alpha(i-1)$ and the current increment $\Delta$, $$\alpha(i) = \alpha(i-1) + \Delta \quad (4)$$

From block 130, the logic flows to an output block 132, which represents the outputting of the current value of the compensation correction factor $\alpha(i)$, after which the logic returns by a path 134 to block 114.

Figure 8:
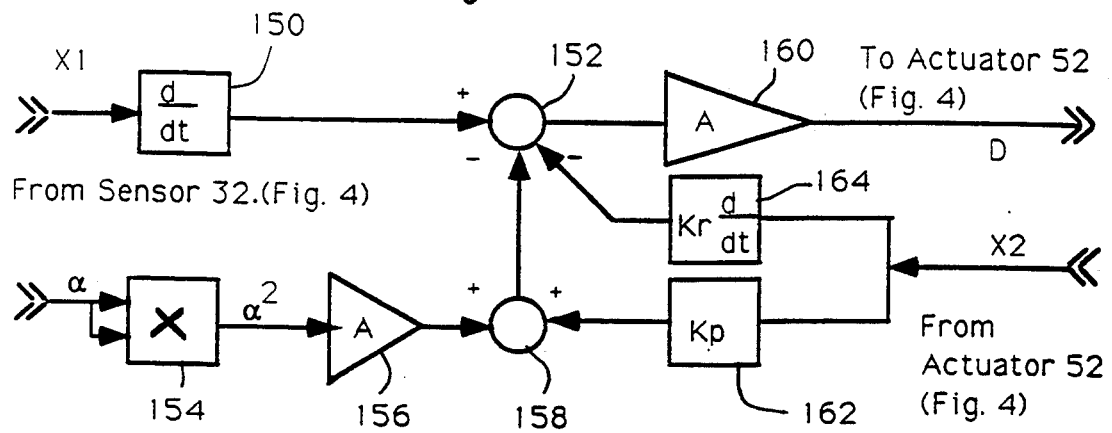
FIG. 8 is a simplified block diagram illustrating details of a portion of FIG. 6.

FIG. 8 is a simplified block diagram of compensation and amplification circuit 82 of FIG. 6. In FIG. 8 mass position signal X1 from sensor 32 of FIG. 4 is applied to a differentiation (d/dt) block 150 which produces a motion rate signal for application to the non-inverting input port of a summing circuit 152. The current compensation correction factor $\alpha(i)$ from logic 80 of FIGS. 6 & 7 is applied to a multiplication block 154 for squaring, and the resulting $\alpha2$ signal is applied to an amplifier block 156 for scaling. The resulting scaled $\alpha2$ signal is applied to a non-inverting input port of a summing circuit 158, the output of which is applied to an inverting input port of summing circuit 152. The output signal from summing circuit 152 is applied to an amplifier 160 to produce actuator drive signal D. The actuator proof mass position signal X2 from actuator 52 of FIG. 4 is applied in common to blocks 162 and 164. Block 162 multiplies the actuator proof mass position signal X2 by a constant proportional gain Kp and applies it to a second non-inverting port of summing circuit 158. Block 164 differentiates signal X2, multiplies the differentiated signal by a constant rate gain Kr and applies the resulting signal to a second inverting port of summing circuit 152. In general, the arrangement of FIG. 8 differentiates the mass position signal X1 to produce a motion rate signal and applies the amplified motion rate signal to actuator 52 with certain corrections. The first correction involves subtraction of scaled compensation correction factor $\alpha_2$, which continuously adjusts the magnitude and phase of the actuator drive signal D in a manner which tends to maintain the integrated energy signal near a minimum, and which provides maximum disturbance rejection over a wide dynamic range. The second correction involves subtraction of the scaled actuator proof mass position and rate which tends to properly stabilize and locate the actuator proof mass within the actuator 52 of FIG. 4.

Figure 9:
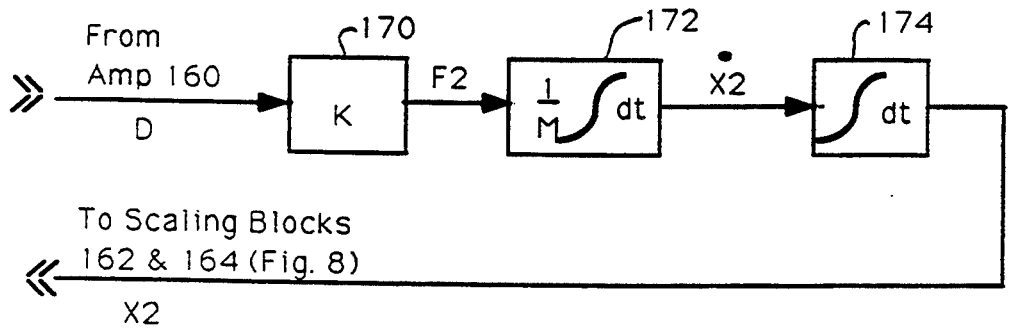
FIG. 9 is a mathematical representation of the actuator of FIG. 5.

FIG. 9 is a block diagram representing the significant dynamics of actuator 52 of FIG. 4. The actuator drive signal D from amplifier 160 of FIG. 8 is converted to a proof mass force, F2, by the voice coil dynamics, represented in block 170, corresponding to voice coil 60 of FIG. 5, by a fixed gain K. The proof mass force F2 is then scaled by the inverse of the proof mass inertia, and time integrated by integrator block 172, to produce the proof mass velocity X2 and integrated again by time integrator block 174 to produce the proof mass position X2. The proof mass position X2 is provided to the compensation and amplification blocks 162 & 164 of FIG. 8.

Figure 10:
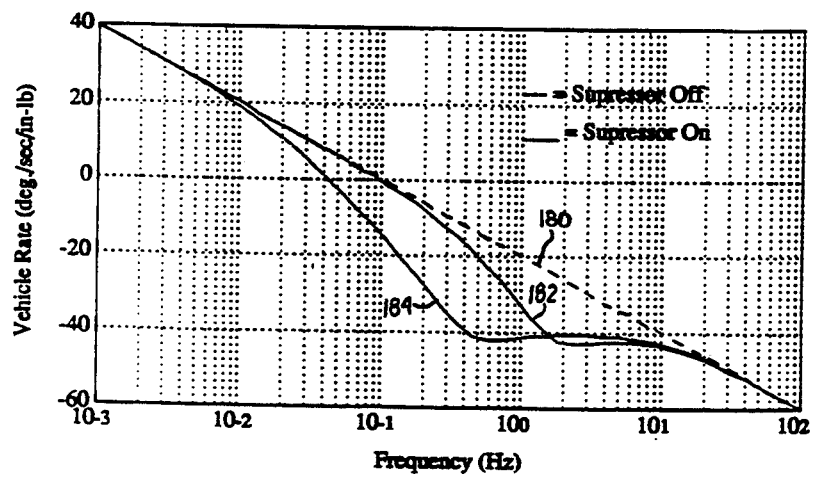
FIG. 10 is a plot illustrating system operation.

The system as described above causes the proof mass actuator loop natural frequency to tend to track the frequency associated with the maximum vibrational energy. FIG. 10 illustrates the calculated results of a spacecraft vehicle in response to a vibrational energy input, both with and without suppression by the described system. In FIG. 10, dash-line plot 180 represents the uncompensated vehicle rotary rate vs. sinusoidal disturbance frequency. Plot 182 represents a closed loop vehicle rotary rate response when the disturbance frequency is approximately 2 Hz, and plot 184 represents a closed loop vehicle rate response when the disturbance frequency is approximately 0.6 Hz. The illustrated amount of suppression depends upon the system gain, the relative vehicle and proof mass inertias, and the like. The plots of FIG. 10 assume a 10 kgm$^2$ vehicle, a 0.5 kgm$^2$ proof mass.

Other embodiments of the invention will be apparent to those skilled in the art. For example, while a 3-axis spring-mass inertial accelerometer has been described, the invention may use an accelerometer with fewer axes of sensing. Inertial sensor 32 of FIG. 4 may be replaced by position sensor 36, illustrated in FIG. 3b connected between mast 26 and the mass of body 12. Instead of a voice coil as illustrated in FIG. 5, a piezoelectric actuator, or possibly hydraulic, pneumatic or other actuators might be used. The invention as described above represents both linear and rotational systems, and might be usable for suppression of both types of disturbance.

What is claimed is:

1. A compensation system for imparting mechanical motion to a proof mass coupled to a moving mass, comprising:
   a first body;
   a second body elastically coupled to said first body;
   a source of energy coupled to at least one of said first and second bodies for causing relative mechanical motion between said first and second bodies;
   a proof mass;
   actuating means coupled to said proof mass and to one of said bodies for causing motion of said proof mass relative to said one of said bodies in response to an actuator drive signal;
   motion sensing means coupled to at least one of said first and second bodies for generating a motion signal representative of undesired mechanical motion and including at least a rate component of said motion;
   motion energy determination means coupled to said motion sensing means, and to said compensation means for squaring said rate component of said motion signal to produce a motion energy signal representative of the energy contained in said motion, for integrating said motion energy signal to produce a integrated energy signal representative of the time window average of the total motion energy, and for generating a compensation correction factor which tends to minimize said integrated energy signal; and
   compensation and amplification means coupled to said motion energy determination means and to said actuating means, for generating said actuating signal, and for using the said compensation correction factor to continuously change the magnitude of said actuator drive signal in a manner which tends to maintain said integrated energy signal near said minimum.

2. A system according to claim 1 in which said motion sensing means is inertial, and is coupled to one of first and second bodies.

3. A system according to claim 1 in which said motion sensing means is a relative motion sensor coupled to both first and second bodies.

4. A method for compensating for undesired mechanical motion of a moving mass by actuating a proof mass coupled to said moving mass, comprising the steps of;
   sensing the motion of a body to generate a motion-representative signal;
   differentiating said motion-representative signal to produce a rate-representative signal;
   squaring said rate representative signal to produce a current-energy-related signal;
   summing a plurality of successive ones of said current-energy-related signals to produce a time integrated signal representative of the motion energy within a time window;
   generating a correction signal in response to said integrated signal;
   squaring said correction signal to produce a squared correction signal;
   sensing the position of a proof mass associated with an actuator coupled to said body to produce a proof mass position signal;
   scaling said proof mass position signal to produce a scaled proof mass position signal;
   differentiating said proof mass position signal to produce a differentiated proof mass position signal;
   summing said squared correction signal, said scaled proof mass position signal and said differentiated proof mass position signal with a signal related to said rate-representative signal to produce an actuator drive signal for driving said proof mass.

5. A method according to claim 4, wherein said step of generating a correction signal comprises the further steps of;

comparing the current value of said integrated signal with a stored minimum value of said integrated signal, setting the current value of said stored minimum value of said integrated signal equal to said integrated signal when the current value of said stored minimum value of said integrated signal is greater than said current value of said integrated signal, and inverting the sign of an increment signal when the current value of said stored minimum value of said integrated signal is less than said current value of said integrated signal; and setting the current value of the correction signal equal to the sum of the previous value of said correction signal and the current increment signal.

* * * * *